No. 847,771. PATENTED MAR. 19, 1907.
E. HILL.
LUBRICATING CUP.
APPLICATION FILED DEC. 15, 1906.
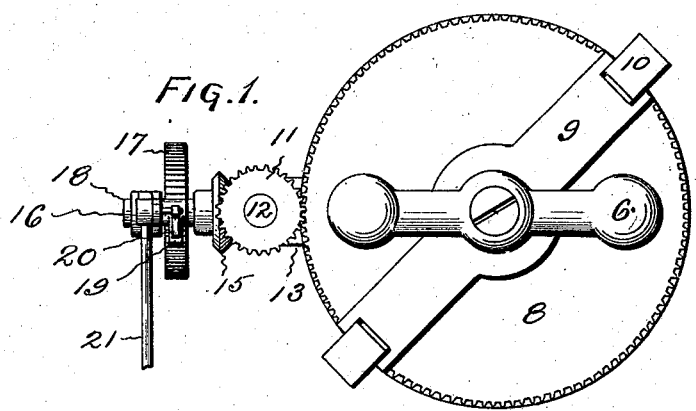
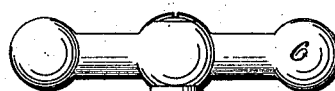
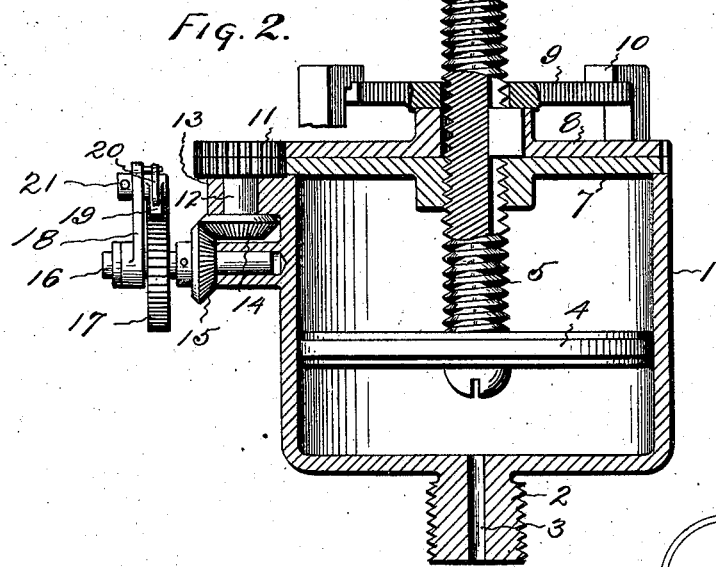
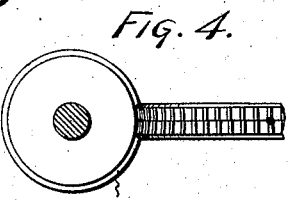
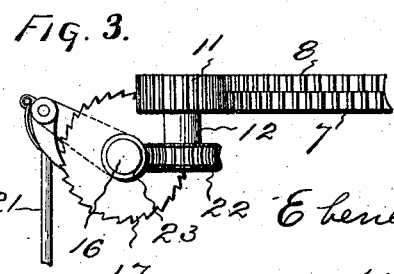
WITNESSES:
S. S. Grotta.
Lena C. Berry.
INVENTOR
Ebenezer Hill
PER
Harry R. Williams
ATTORNEY.
THE NORRIS PETERS CO., WASHINGTON, D. C.

UNITED STATES PATENT OFFICE.

EBENEZER HILL, OF NORWALK, CONNECTICUT.

LUBRICATING-CUP.

No. 847,771.  Specification of Letters Patent.  Patented March 19, 1907.

Application filed December 15, 1906. Serial No. 347,970.

*To all whom it may concern:*

Be it known that I, EBENEZER HILL, a citizen of the United States, residing at Norwalk, in the county of Fairfield and State of Connecticut, have invented a new and useful Lubricating-Cup, of which the following is a specification.

This invention relates to a lubricating-cup which is constructed to positively feed oil or grease to a bearing or other part which it is desired to keep supplied with lubricant.

The object of the invention is to provide a simple cup which will positively feed slowly and uniformly the necessary amount of lubricant, the feed being adjusted to and increasing and diminishing the flow according to the speed of the apparatus or parts which it is desired to lubricate.

The embodiment of the invention which is illustrated has a cup which can be easily filled with oil or grease of the required consistency and be attached to the casing or frame of the part which is to be lubricated. In the cup is a piston or plunger which is slowly forced toward the inner end of the cup by gearing actuated from some moving part of the machine. This gearing is so designed that the rate of feed of the piston will be exceedingly slow, yet will vary with the speed of the machine to which the cup is applied.

Figure 1 of the accompanying drawings shows a plan of a cup which embodies the invention. Fig. 2 shows a central section of the same cup. Fig. 3 shows a detail of a modified arrangement of the gearing, and Fig. 4 shows another method of gearing.

The cup 1 may be made any suitable size and shape of any convenient material. At the lower end the cup preferably has a threaded hub 2 with the passage 3, by means of which it may be secured to the bearing or to the casing or frame supporting the parts to be lubricated.

In the cup is a piston 4, fastened to the inner end of a threaded spindle 5, the outer end of which is provided with a handle 6. Threaded upon the spindle is a gear 7, preferably of such size that it will close the open end of the cup. Keyed on the spindle is a gear 8. The keyway is cut the whole length, and the keyed hub slides on the spindle. These gears are the same diameter and preferably have different numbers of teeth. For instance, the outer gear may have one hundred teeth, and the inner gear may have one hundred and one teeth. Loose upon the spindle is a yoke 9, the ends of which loosely engage the fingers 10, which extend from the open end of the cup.

Meshing with the gears is a pinion 11 on a stud 12, that is supported by a bracket 13, projecting from the cup, and that has a beveled gear 14, meshing with which is a beveled gear 15 on a short shaft 16, which is provided with a ratchet 17. The gear 11 may be formed of two parts, and if the gears 7 and 8 have different numbers of teeth these parts may have the same numbers; but if the gears 7 and 8 have the same numbers of teeth these parts would have different numbers. Loose on the shaft adjacent to the ratchet is an arm 18, which has a pawl 19, that is held in engagement with the ratchet-teeth by a spring 20. The arm is designed to be connected by a rod or wire 21 with any movable part of the machine.

When the arm is reciprocated by the operation of the machine, the pawl advances the ratchet a tooth at a time and through the beveled gears imparts to the pinion an intermittent rotatory movement, which of course is imparted to both of the large gears. As the threaded inner gear has more teeth than the keyed outer gear, when the inner gear has made one revolution the outer is a little ahead. If the gears have the above-suggested numbers of teeth, when the inner gear has made one hundred revolutions the outer is just one revolution ahead. Hence the one more revolution of the outer with respect to the inner would move the spindle and piston inwardly a distance equal to the pitch of one thread. If, for instance, the threads on the spindle were twenty to the inch and the teeth of the gears were as stated, it would require two thousand turns of the inner gear to feed the piston one inch. The relative sizes of the gears and driving-pinions and ratchet can easily be arranged so that, for instance, one hundred movements of the lever or connecting-rod per minute would require the continuous operation of the machine for a week to feed the piston down the three or four inches of an ordinary oil or grease cup.

It is obvious, as shown in Fig. 3, that instead of using the beveled gears the stud 12 could be provided with a worm-wheel 22 and the ratchet-shaft 16 could be provided with a worm 23. Such a construction as this would cause the inward feed of the piston to be much slower than above described. If desired, the differential gears could be provided with worm-teeth and a worm 24 arranged to mesh directly with these gears, as shown in Fig. 4. In this case the feed would be exceedingly slow.

To open the cup, the yoke is turned so that its ends are free from the fingers, and then by the handle the spindle, yoke, gears, and piston can be removed. After the cup is filled with oil or grease of the desired nature the parts are replaced, the inner gear first being turned on the thread up to the piston, the outer gear and yoke following. When the parts are replaced and the yoke engaged with the fingers, the piston is at the outer end of the cup, adjacent to the gears. As the machine is operated the piston is moved in very slowly and the lubricant expelled through the outlet to the bearing at the rate necessary to cause the proper lubrication. As the feed is uniform and sure and proportional to the speed of the machinery, only a comparatively small quantity of lubricant is required to properly lubricate the bearing, which results in a great saving of lubricant and maximum efficiency and durability of the bearing, and as the feed is very slow this cup is particularly serviceable for high-speed engines, such as are used in automobiles.

The invention claimed is—

A lubricating-cup having a piston movable in the cup, a threaded spindle supporting the piston, a gear threaded upon the spindle and forming a cover for the open end of the cup, a gear on and arranged to turn the spindle and resting upon and holding the threaded cover-gear in place, said gears having different numbers of teeth, fingers projecting from the cup, a yoke extending across and holding the outer gear in place and engaging the fingers attached to the cup, and gearing supported by the cup and meshing with the differential gears, substantially as specified.

EBENEZER HILL.

Witnesses:
E. HILL, Jr.,
S. M. STEVENS.